United States Patent
Kondo et al.

(10) Patent No.: US 9,898,234 B2
(45) Date of Patent: Feb. 20, 2018

(54) PRINTER, OPERATION TERMINAL, AND RECORDING MEDIUM

(71) Applicant: Brother Kogyo Kabushiki Kaisha, Nagoya-shi, Aichi-ken (JP)

(72) Inventors: Koichi Kondo, Inuyama (JP); Kazuya Nakagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/460,344

(22) Filed: Mar. 16, 2017

(65) Prior Publication Data

US 2017/0277486 A1 Sep. 28, 2017

(30) Foreign Application Priority Data

Mar. 28, 2016 (JP) ................................ 2016-063976

(51) Int. Cl.
| | |
|---|---|
| G06F 15/00 | (2006.01) |
| G06F 3/12 | (2006.01) |
| G06K 1/00 | (2006.01) |
| G06K 15/02 | (2006.01) |
| G06K 15/00 | (2006.01) |

(52) U.S. Cl.
CPC .......... *G06F 3/1236* (2013.01); *G06F 3/1204* (2013.01); *G06F 3/1285* (2013.01); *G06K 15/028* (2013.01); *G06K 15/4045* (2013.01)

(58) Field of Classification Search
CPC .... G06F 3/1236; G06F 3/1204; G06F 3/1285; G06K 15/028; G06K 15/4045
USPC ................................ 358/1.1, 1.15, 1.13, 1.14
See application file for complete search history.

(56) References Cited

U.S. PATENT DOCUMENTS

| | | | | |
|---|---|---|---|---|
| 2013/0176595 | A1* | 7/2013 | Yamada | ................ G06F 3/1222 358/1.16 |
| 2014/0253946 | A1* | 9/2014 | Sato | ................... G06K 15/4055 358/1.14 |

FOREIGN PATENT DOCUMENTS

| | | |
|---|---|---|
| JP | 2003-163711 A | 6/2003 |
| JP | 2004-289253 A | 10/2004 |
| JP | 2015-012443 A | 1/2015 |

* cited by examiner

*Primary Examiner* — Douglas Tran
(74) *Attorney, Agent, or Firm* — Banner & Witcoff, Ltd.

(57) ABSTRACT

The disclosure discloses a printer including a communication device, a processor, and a memory. The memory stores computer-executable instructions that cause the printer to perform a connection control process, an operation control process, and a mode control process. In the connection control process, an exclusive connection with a first operation terminal is established while excluding at least one second operation terminal. In the operation control process, printing is performed by controlling plurality of operation mechanisms after establishment of the exclusive connection. In the mode control process, a first switching mode or a second switching mode is selectively executed. The exclusive connection established with the first operation terminal is disconnected at a predetermined timing after completion of the printing in the first switching mode. The exclusive connection established with the first operation terminal is maintained without being disconnected at the predetermined timing in the second switching mode.

13 Claims, 10 Drawing Sheets

[FIG. 1]
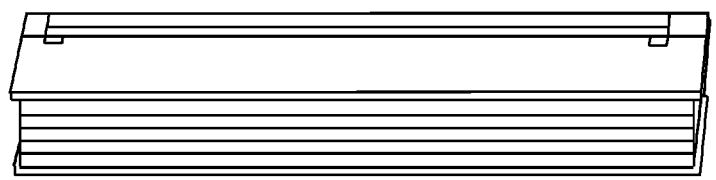
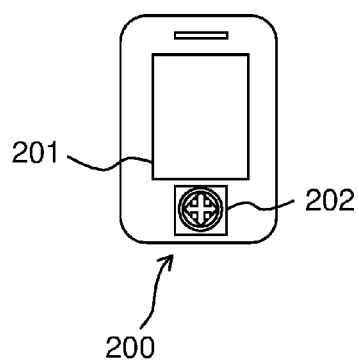

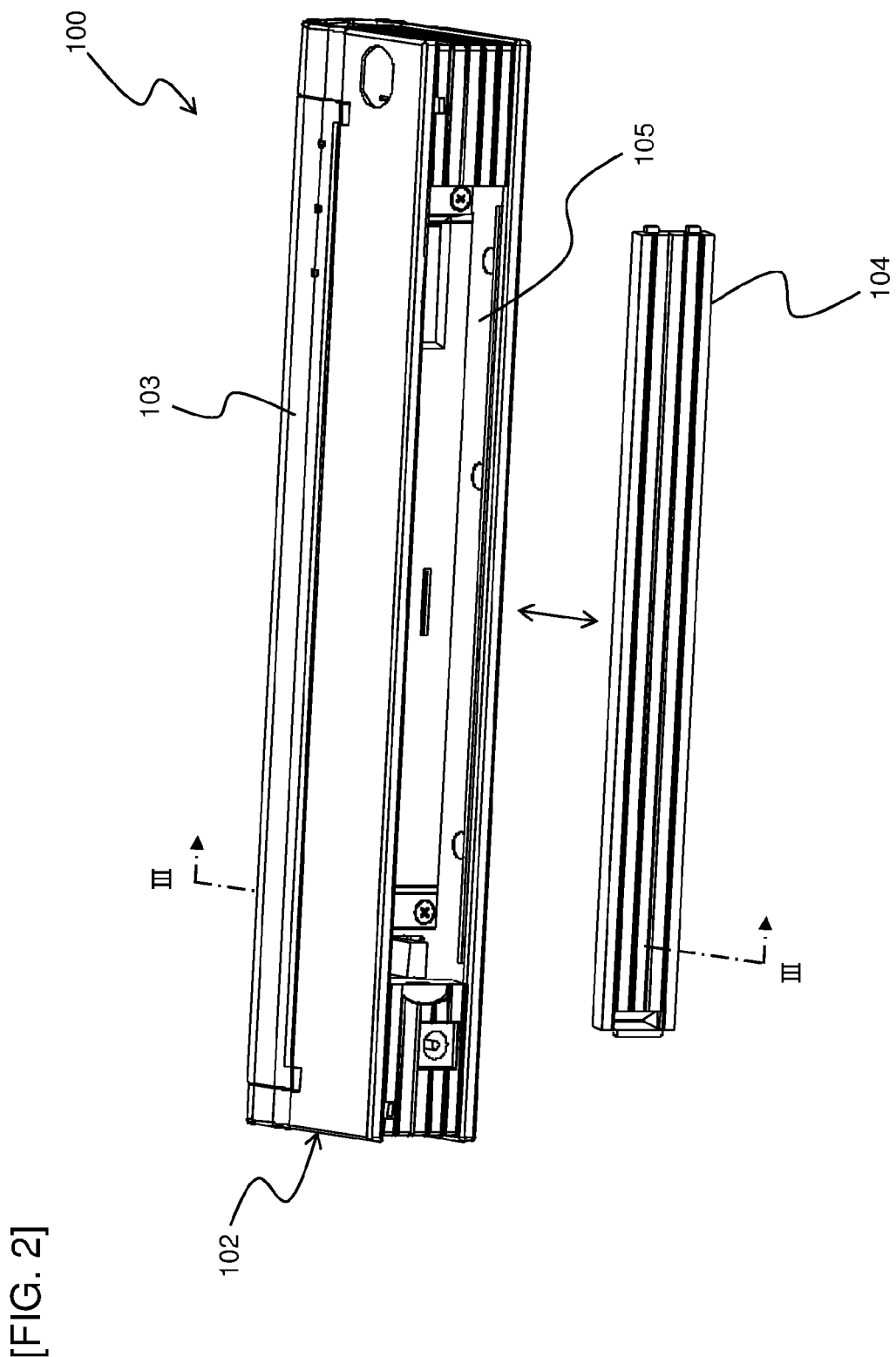
[FIG. 2]

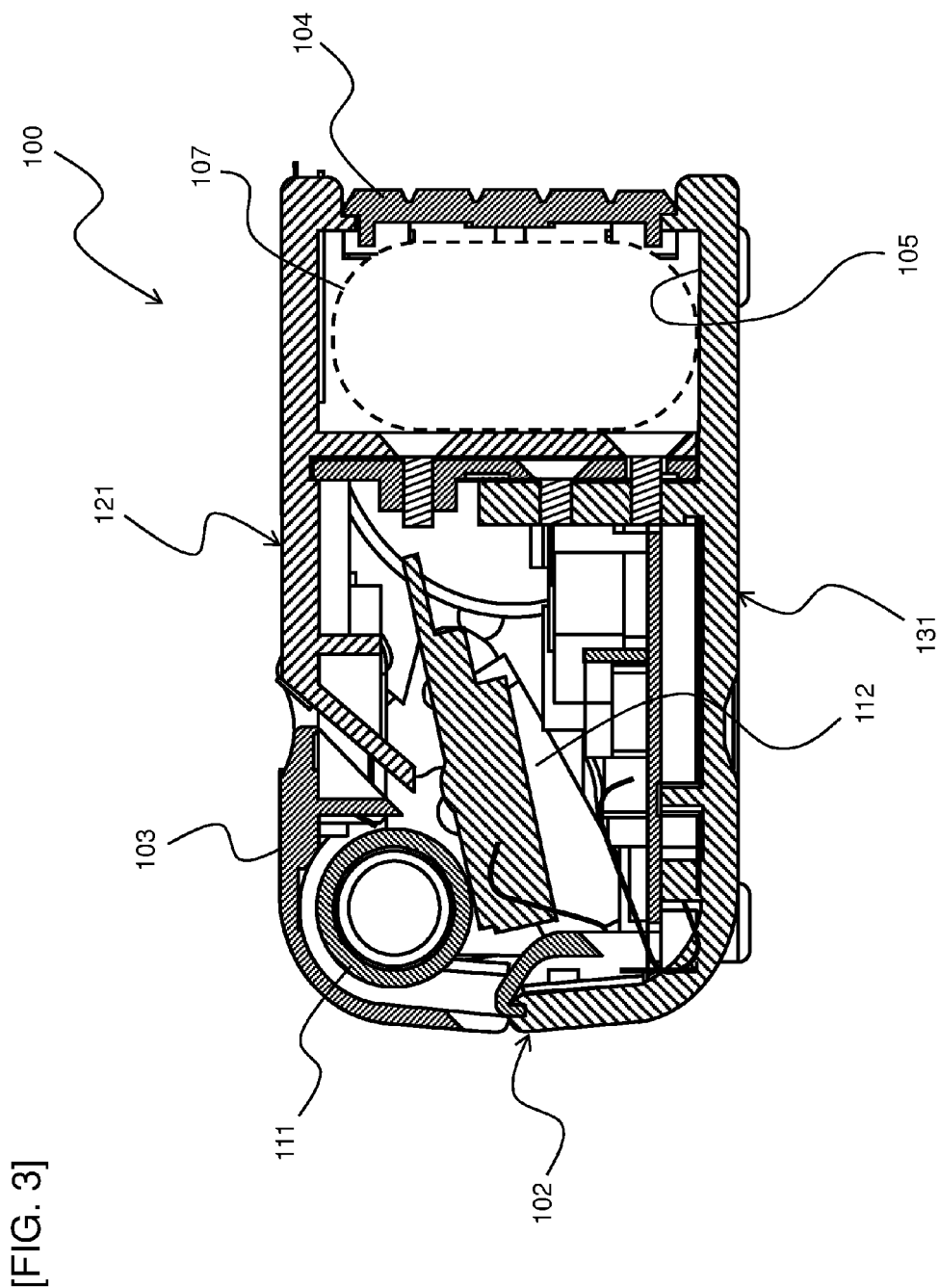
[FIG. 3]

[FIG. 4]
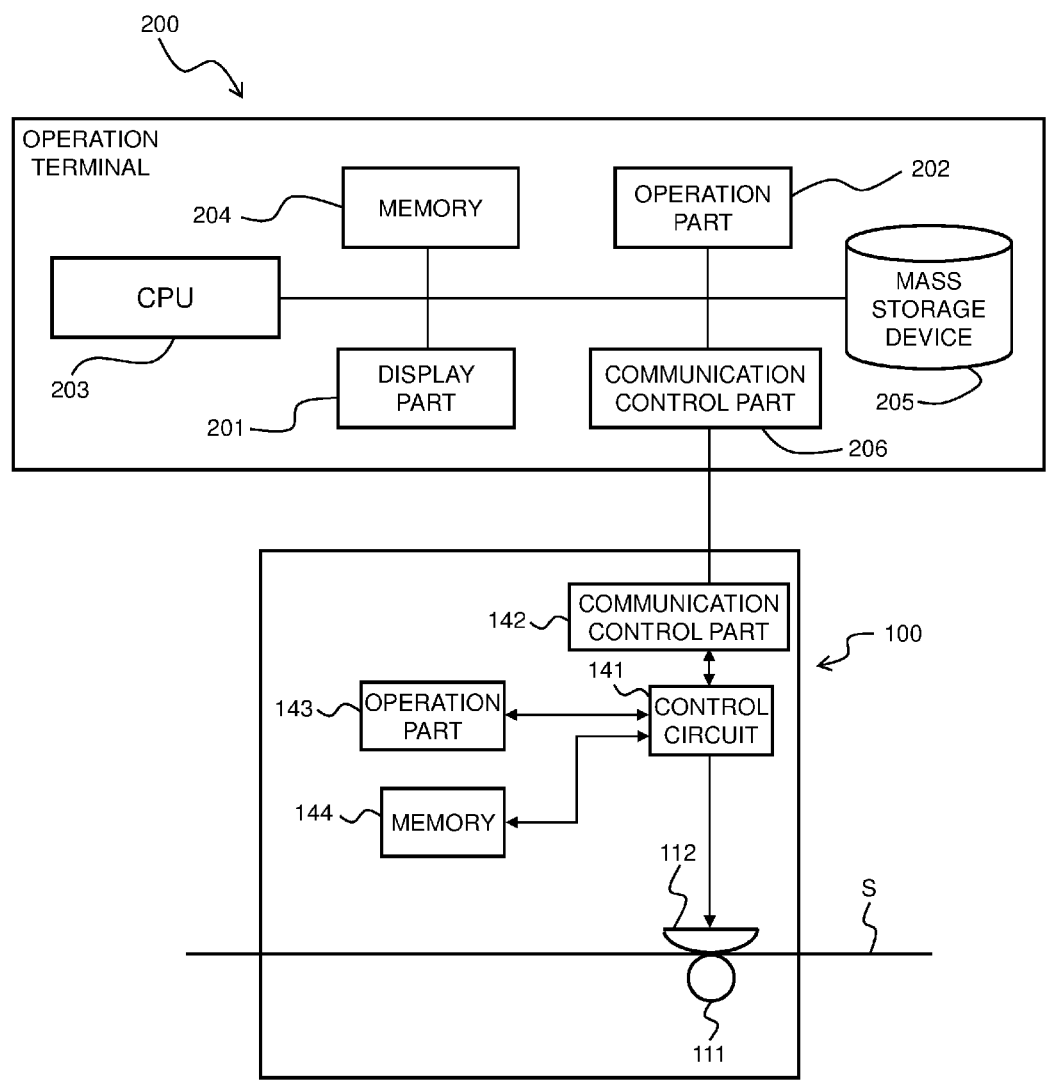

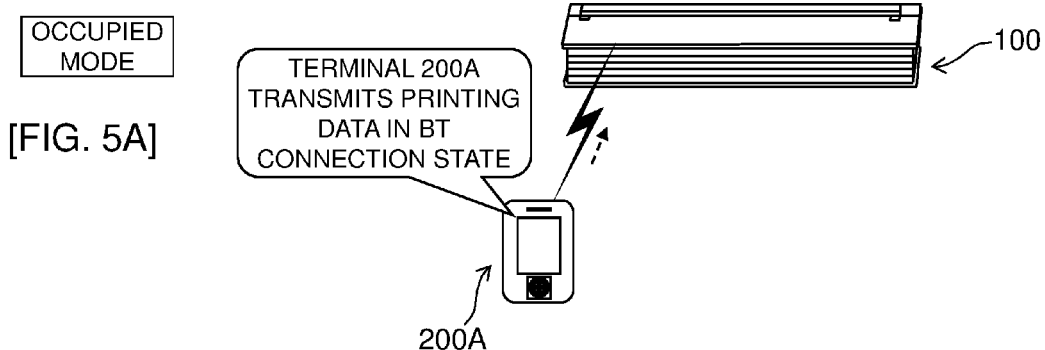
[FIG. 5A]
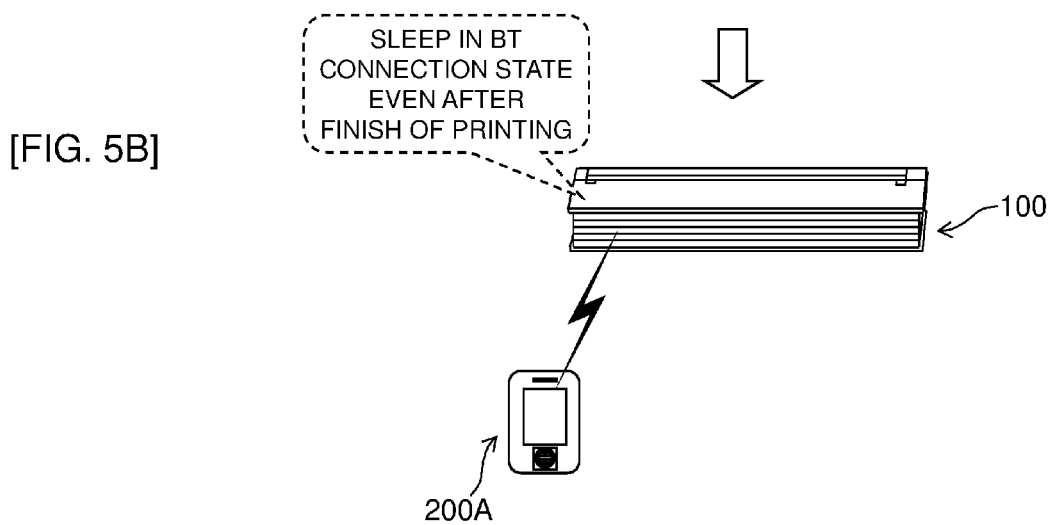
[FIG. 5B]
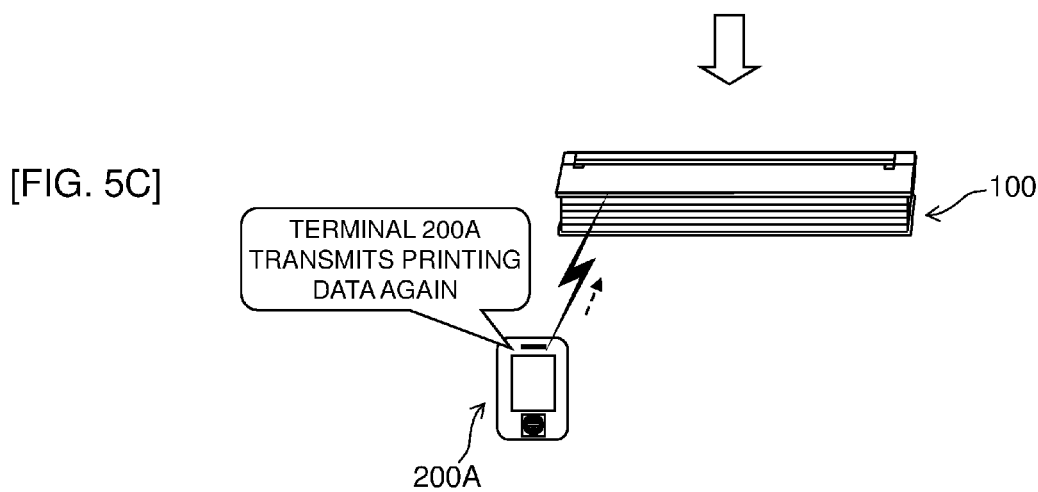
[FIG. 5C]

[FIG. 6A]
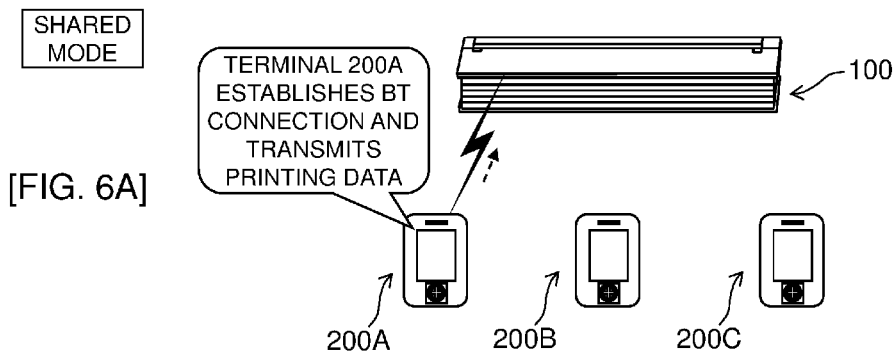
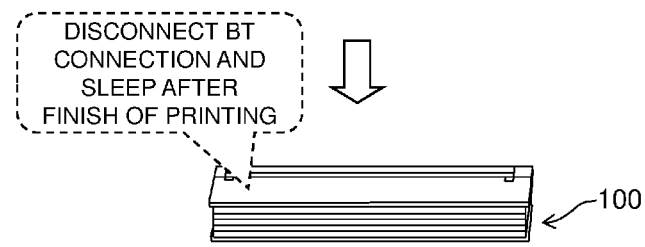
[FIG. 6B]
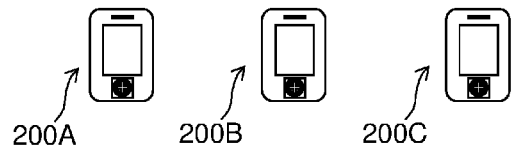
[FIG. 6C]
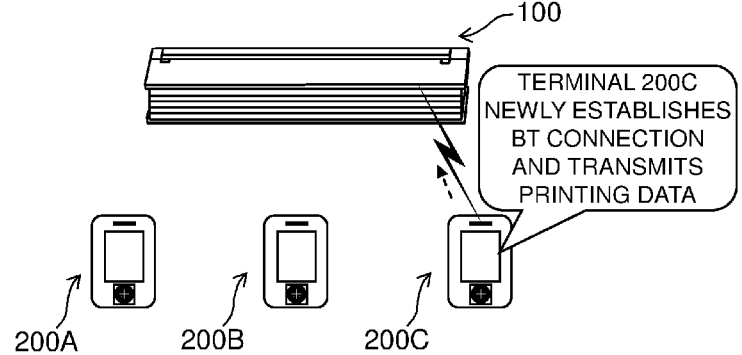

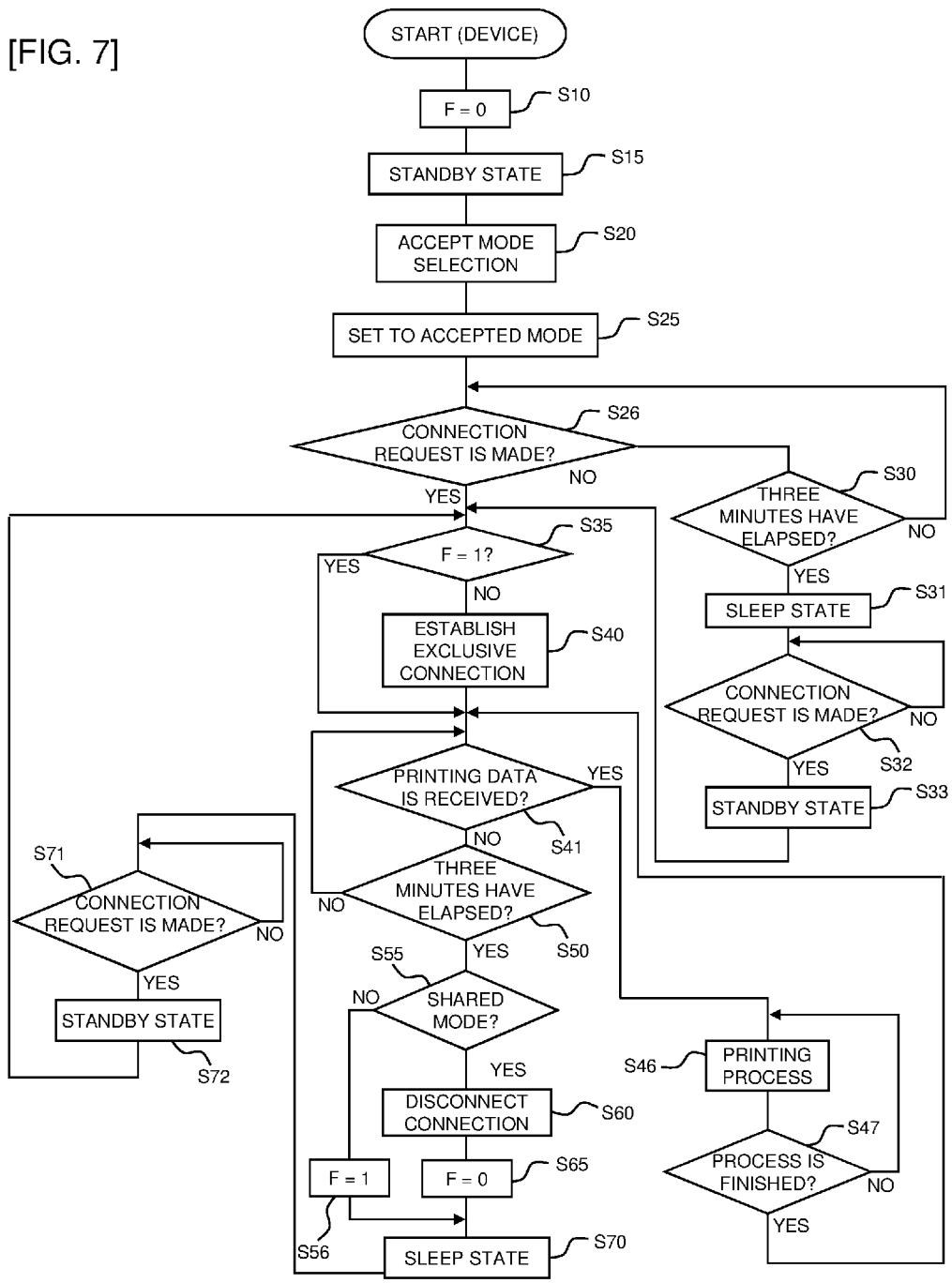
[FIG. 7]

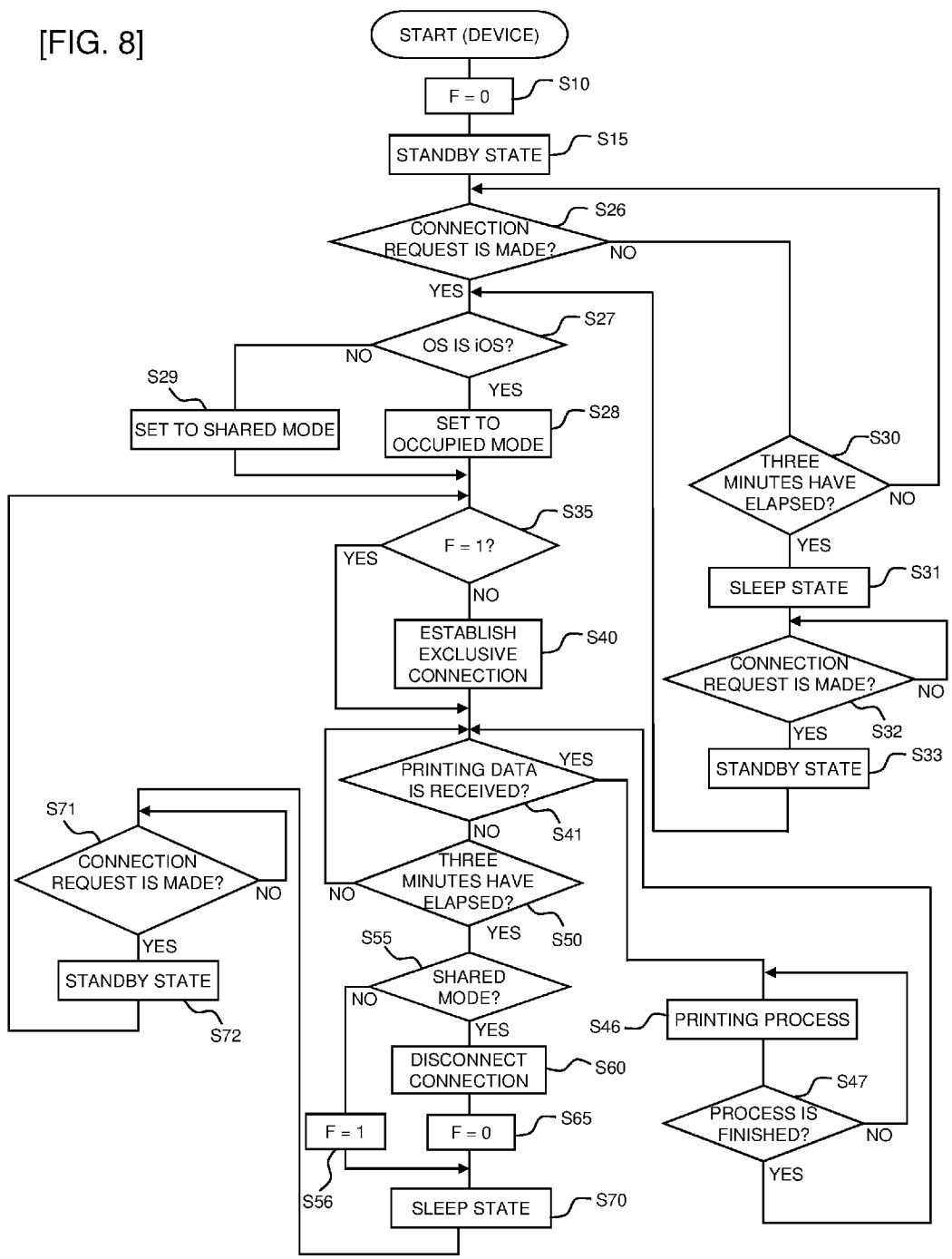
[FIG. 8]

[FIG. 9]
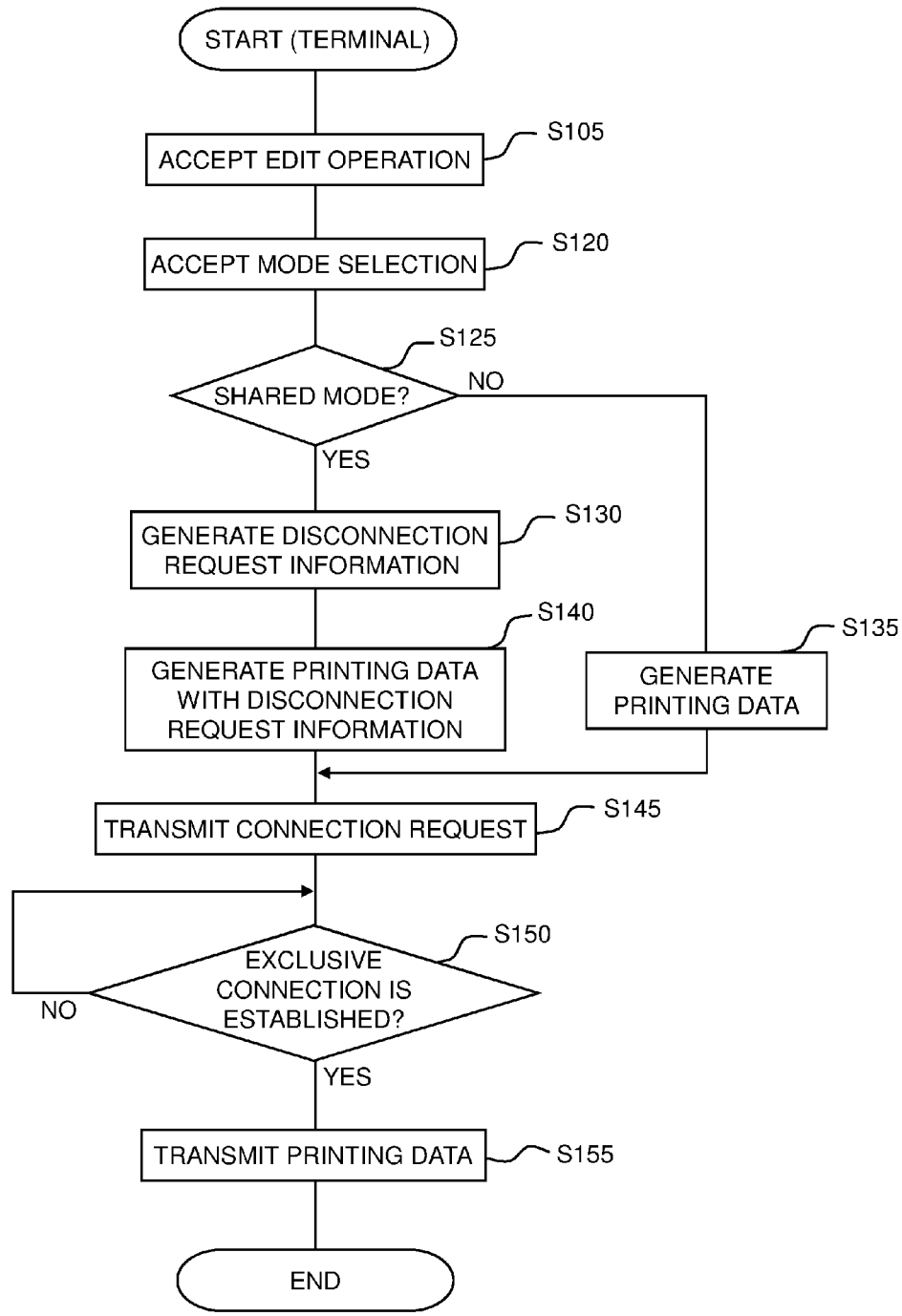

[FIG. 10]
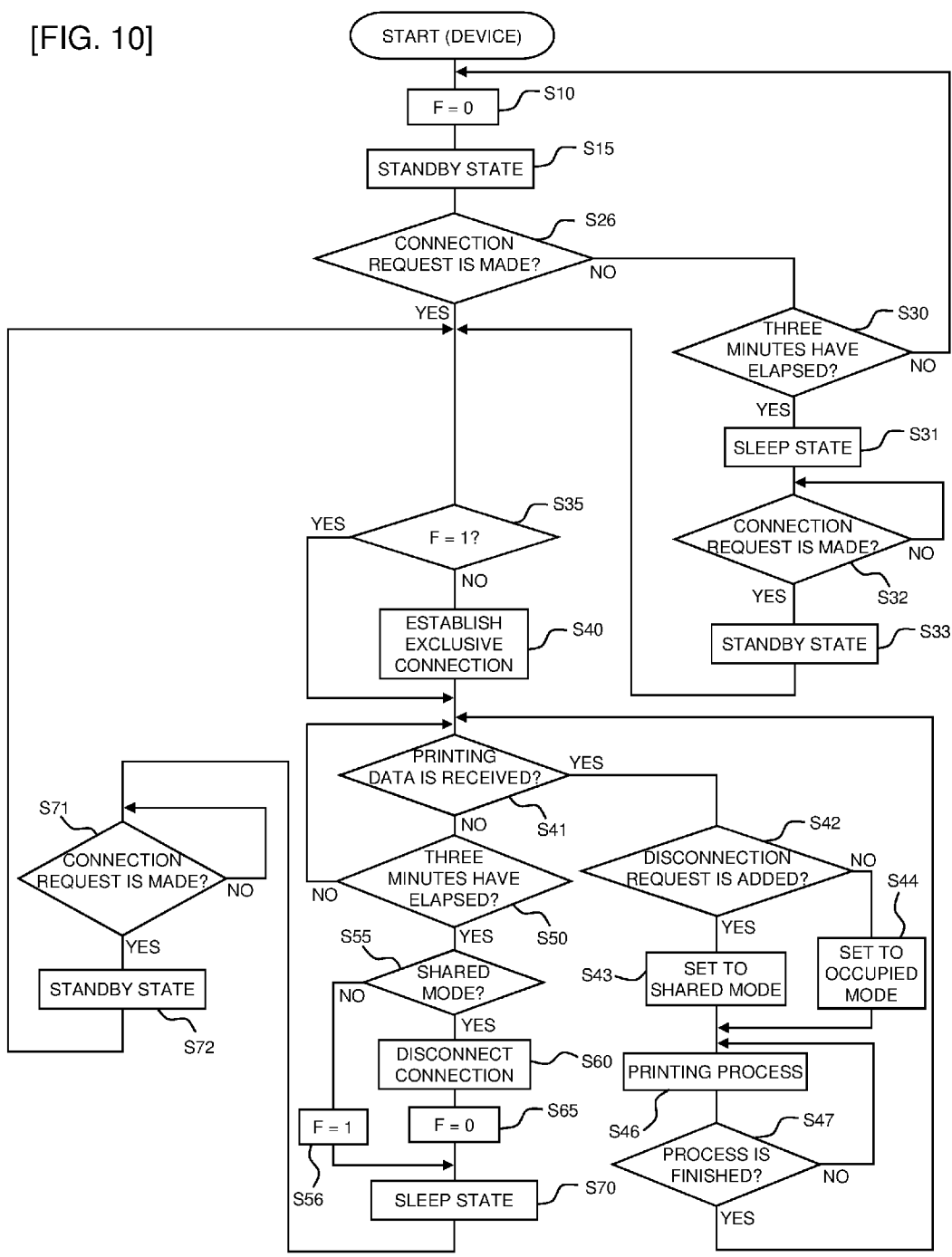

PRINTER, OPERATION TERMINAL, AND RECORDING MEDIUM

CROSS-REFERENCE TO RELATED APPLICATION

The present application claims priority from Japanese Patent Application No. 2016-063976, which was filed on Mar. 28, 2016, the disclosure of which is incorporated herein by reference in its entirety.

BACKGROUND

Field

The present disclosure relates to a printer connected to an operation terminal through mutually-recognized wireless communication, an operation terminal used for the communication, and a recording medium.

Description of the Related Art

A printer connected to an operation terminal through mutually-recognized wireless communication is already known. In this prior art, the printer and the operation terminal are connected through Bluetooth (registered trademark) communication to acquire printing data from the operation terminal. A printing process is then executed in accordance with the printing data.

When a printer and an operation terminal are connected through mutually-recognized wireless communication as described above, the printer and only one operation terminal may exclusively be connected while excluding the other operation terminals depending on a communication method and a version thereof. In this case, different needs arise with respect to how the exclusive connection is processed after completion of a print process, depending on a user's utilization form (usage scene).

For example, if one printer is shared by a large number of users and one user finishes using the printer, it is more convenient to automatically disconnect the exclusive connection between the operation terminal of the user and the printer so that any other user can use the printer thereafter. In contrast, if one user is occupying and using a printer, it is more convenient to continue communication connection without disconnecting the communication connection each time a printing process is finished as described above. In the prior art, no particular consideration is given to such a point.

SUMMARY

It is therefore an object of the present disclosure to provide a printer, an operation terminal, and a recording medium capable of improving the convenience with a mode corresponding to a user's usage scene in the case of exclusive connection through mutually-recognized wireless communication with an operation terminal.

In order to achieve the above-described object, according to an aspect of the present application, there is provided a printer comprising a plurality of operation mechanisms, a communication device, a processor, and a memory. The plurality of operation mechanisms are configured to be operated by supplied electric power and include a feeder configured to feed a print-receiving medium and a printing head configured to perform a desired print on the print-receiving medium. The communication device is provided in the printer and is configured to perform mutually-recognized wireless communication. The memory stores computer-executable instructions that, when executed by the processor, cause the printer to perform a connection control process, an operation control process, and a mode control process. In the connection control process, an exclusive connection with a first operation terminal through the mutually-recognized wireless communication is established while excluding at least one second operation terminal other than the first operation terminal. In the operation control process, printing onto the print-receiving medium is performed by controlling the plurality of operation mechanisms in accordance with printing data received from the first operation terminal after establishment of the exclusive connection in the connection control. In the mode control process, a first switching mode or a second switching mode is selectively executed. The exclusive connection established with the first operation terminal is disconnected at a predetermined timing after completion of the printing in the first switching mode. The exclusive connection established with the first operation terminal is maintained without being disconnected at the predetermined timing in the second switching mode.

The printer of the present disclosure is connected to an operation terminal through mutually-recognized wireless communication and performs desired printing. In particular, under the control through a connection control process, exclusive connection is established only with one certain operation terminal (the first operation terminal) (while excluding the other operation terminals), and the printing data is acquired from the first operation terminal. Subsequently, operation the mechanisms such as the feeder and the printing head are controlled through an operation control process to perform printing on the print-receiving medium.

In the present disclosure, two modes are prepared as the first switching mode and the second switching mode with respect to how the exclusive connection is processed after the printing is finished in this way.

The first switching mode is a mode in which the exclusive connection between the operation terminal and the printer established as described above is disconnected at an appropriate timing after completion of printing. Since the exclusive connection is reliably eliminated each time printing according to printing data from one operation terminal is finished, this is preferable when one printer is shared and used by a plurality of operation terminals alternately connecting thereto, for example.

The second switching mode is a mode in which the established exclusive connection is maintained without being disconnected as described above. After one operation terminal is exclusively connected with the printer, the exclusive connection is continuously maintained (e.g., unless a disconnection operation is voluntarily performed) even if printing according to printing data from the operation terminal is finished and, therefore, this is preferable when one printer is occupied and used by only one operation terminal for a long time, for example.

As described above, in the present disclosure, the optimum mode can be executed and used in accordance with a form in which a user uses one printer (in other words, the number of operation terminals using the printer). Therefore, the user can selectively use the optimum mode in accordance with the usage scene, so that the convenience can be improved.

BRIEF DESCRIPTION OF THE DRAWINGS

FIG. 1 is a system configuration diagram of a configuration of a printing system according to an embodiment of the present disclosure.

FIG. 2 is a perspective view of an appearance configuration of a portable printer.

FIG. 3 is a side cross-sectional view of an internal structure of the portable printer taken along a line III-III of FIG. 2.

FIG. 4 is a block diagram of functional configurations of the portable printer and an operation terminal.

FIG. 5A is a diagram for conceptually explaining a main communication flow when an instruction is given for staring printing in an occupied mode in the printing system.

FIG. 5B is a diagram for conceptually explaining a main communication flow when an instruction is given for staring printing in an occupied mode in the printing system.

FIG. 5C is a diagram for conceptually explaining a main communication flow when an instruction is given for staring printing in an occupied mode in the printing system.

FIG. 6A is a diagram conceptually explaining a main communication flow when an instruction is given for staring printing in a shared mode in the printing system.

FIG. 6B is a diagram conceptually explaining a main communication flow when an instruction is given for staring printing in a shared mode in the printing system.

FIG. 6C is a diagram conceptually explaining a main communication flow when an instruction is given for staring printing in a shared mode in the printing system.

FIG. 7 is a flowchart of control carried out by a control circuit of the portable printer.

FIG. 8 is a flowchart of control carried out by the control circuit of the portable printer according to a modification example in which the shared mode or the occupied mode is set in accordance with an identification result of the operation terminal (or an operating system (OS)).

FIG. 9 is a flow chart of control carried out by a CPU of the operation terminal in a modification example in which the operation terminal generates and transmits disconnection request information to the portable printer.

FIG. 10 is a flowchart of control carried out by the control circuit of the portable printer.

DETAILED DESCRIPTION OF THE PREFERRED EMBODIMENTS

An embodiment of the present disclosure will now be described with reference to the drawings.
<System Configuration>

A system configuration of a printing system of this embodiment will be described with reference to FIG. 1. In FIG. 1, a printing system PS has a portable printers 100 that can be driven by a battery power source (see FIG. 3 described later), and a plurality of operation terminals 200. The portable printer 100 and one of the operation terminals 200 are connected through mutually-recognized wireless communication with connection authentication such as Bluetooth communication and ad-hoc communication (hereinafter, simply referred to as "Bluetooth communication"). In a method or a version of this Bluetooth communication used in this embodiment, only one of the operation terminals 200 can exclusively be connected to the one portable printer 100. Therefore, while one of the operation terminals 200 has established connection with the portable printer 100, the other operation terminals 200 cannot connect and communicate with the portable printer 100.

The operation terminal 200 is, for example, an information terminal such as a PDA (personal digital assistance) and a smartphone (a mobile phone provided with a PDA function) having a function corresponding to the Bluetooth communication. The operation terminal 200 has a display part 201 such as a liquid crystal display and an operation part 202 made up of a keyboard, a mouse, and buttons, for example. In this example, the operation terminal 200 can transmit a printer code to the portable printer 100 through the Bluetooth communication so as to print desired printing data. The printer code is a control code for causing the portable printer 100 to perform printing with specified characters, format, etc.
<Printer Configuration>

An appearance configuration of the portable printer 100 will be described with reference to FIG. 2.

In FIG. 2, the portable printer 100 includes a housing 102 formed into a substantially rectangular parallelepiped shape as a whole. A cover member 103 is provided on an upper surface of the housing 102 on the far side of FIG. 2 such that the cover member 103 can be opened and closed. At the time of printing, a print-receiving sheet S (see FIG. 4 described later) is inserted into a gap (not shown) of the cover member 103. A side surface located on the near side of the housing 102 of FIG. 2 corresponds to a back surface portion of the portable printer 100, and a detachable/attachable battery chamber cover 104 is provided on the back surface portion. While the battery chamber cover 104 is removed, a battery storage chamber 105 (see FIG. 3 described later) storing a substantially bar-shaped battery power source 107 (see FIG. 3 described later) is opened in the back surface portion of the housing 102.

An internal structure of the portable printer 100 will be described with reference to FIG. 3.

In FIG. 3, a platen roller 111 and a thermal line head 112 are provided in the housing 102. The platen roller 111 is rotatably supported inside the housing 102 and is rotationally driven by a drive mechanism not shown to transport the print-receiving sheet S (see FIG. 4 described later). The thermal line head 112 is disposed to freely contact with and separate from the platen roller 111 and comes into contact with the platen roller 111 with a predetermined pressing force at the time of printing so as to perform desired printing on the print-receiving sheet S inserted therebetween.

In the usual case, the print-receiving sheet S is inserted into a transport path in the gap with the cover member 103 closed so that the print-receiving sheet S is transported by the platen roller 111, and the desired printing is performed by the thermal line head 112 on the print-receiving sheet S. To remove a paper jam, the cover member 103 is opened. Since this releases the platen roller 111 from the thermal line head 112, the sheet can easily be pulled out.

The housing 102 includes a top cover 121, an under cover 131, and two side covers (not shown).
<Functional Configuration>

Functional configurations of the portable printer 100 and the operation terminal 200 will be described with reference to FIG. 4.

In FIG. 4, the portable printer 100 includes the thermal line head 112 performing desired printing on the print-receiving sheet S, the platen roller 111, a control circuit 141 including a CPU functioning as a processor, a memory 144 made up of a RAM, a ROM, etc., an operation part 143 capable of inputting instructions and information from a user, a communication control part 142 controlling the Bluetooth communication performed with the operation terminal 200, and the battery power source 107.

On the other hand, the operation terminal 200 is an information terminal having a Bluetooth communication function as described above. The operation terminal 200 includes a CPU 203, a memory 204 functioning as a recording medium made up of a RAM, a ROM, etc., the operation part 202 to which instructions and information are input from a user, the display part 201 displaying various pieces of information and messages, a mass storage device 205 made up of a hard disk device etc. and storing various pieces of information, and a communication control part 206 controlling information transmission/reception to/from the portable printer 100 through wireless communication.

The CPU 203 executes a signal process in accordance with a program stored in advance in the ROM while utilizing a temporary storage function of the RAM, thereby transmitting/receiving various instruction and information signals to/from the portable printer 100.

The mass storage device 205 (or the memory 204) stores a pairing program and a program for converting a printing command into a printer code for each type of a predetermined format such as a character style and a font. The portable printer 100 has a predefined PIN code functioning as a confirmation identifier (passcode) for connection authentication permitting the operation of the portable printer 100. Only when the PIN code corresponding to the portable printer 100 is received through the Bluetooth communication from the operation terminal 200, the portable printer 100 authenticates the operation terminal 200 as an operating entity (=pairing between the operation terminal 200 and the portable printer 100). After completion of the pairing, the operation terminal 200 functions as a "master" (particularly, a central device in the Bluetooth standard) and the portable printer 100 functions as a "slave" (particularly, a peripheral device in the Bluetooth standard). Therefore, although not described in detail, a data packet from the operation terminal 200 to the portable printer 100 can be transmitted at an arbitrary timing, while a data packet from the portable printer 100 to the operation terminal 200 is transmitted only when permission of the operation terminal 200 is obtained through a known technique and a command from the operation terminal 200 is received.

<Feature of Embodiment>

In the system configuration as described above, a plurality of modes related to connection/disconnection between the operation terminal 200 and the portable printer 100 are prepared in this embodiment in accordance with a form in which a user uses the portable printer 100 (in other words, the number of the operation terminals 200 using the portable printer 100). The details will be described below.

As described above, the portable printer 100 of this embodiment is exclusively connected to the operation terminal 200 through the Bluetooth communication as described above to perform desired printing on the print-receiving sheet S. In particular, under the control of the control circuit 141 of the portable printer 100, the exclusive connection is established only with a certain one of the operation terminals 200 while excluding the other operation terminals 200, and printing data is acquired from the operation terminal 200. The control circuit 141 controls the platen roller 111 and the thermal line head 112 in accordance with the printing data, so that the printing process onto the print-receiving sheet S is executed.

<Shared Mode and Occupied Mode>

In the present embodiment, two modes are prepared as a shared mode and an occupied mode with respect to how the exclusive connection is processed after a printing process is finished as described above and, for example, the user can operate the operation part 143 to select and input one of the two modes by himself/herself.

<Occupied Mode>

The occupied mode is a mode preferable when the one portable printer 100 is occupied and used by only one of the operation terminals 200 for a long time, for example, and the exclusive connection established as described above is maintained without being disconnected as in the shared mode described later. As shown in FIG. 5A, after one operation terminal 200A is exclusively connected to the portable printer 100, the printing data is transmitted from the operation terminal 200A (see a dashed arrow) and, even if the printing process according to the printing data is finished, the exclusive connection is continuously maintained (e.g., unless a disconnection operation is voluntarily performed from the operation terminal 200A).

<Switching to Sleep State>

In the present embodiment, from the viewpoint of saving electric power energy, the portable printer 100 switches under the control of the control circuit 141 into a so-called sleep state that is a low power consumption state after the elapse of an appropriate reference time (so-called idle time) from completion of a printing process. Although not shown in detail, the portable printer 100 of this embodiment is divided into a print module function portion and a communication function module portion from the viewpoint of the sleep operation. When the sleep state is entered, the printing module function portion is put into a completely dormant state and does not perform any operation until exiting the sleeping state. In contrast, the communication function module portion transmits a known advertising signal at predetermined intervals as the peripheral device even in the sleep state. In the sleep state, this advertising signal is always received by the operation terminal 200A (functioning as the central device). As a result, even when the portable printer 100 is in the sleep state, the portable printer 100 in the sleep state can be activated by outputting a known command again from the operation terminal 200A, so that data transmission/reception can be executed.

During execution of the occupied mode, even when the idle time has elapsed and the switching to the sleep state is made after the printing process is finished as described above, the exclusive connection through Bluetooth is maintained (in the established state) without being disconnected (see FIG. 5B).

The portable printer 100 maintains the Bluetooth connection state to the operation terminal 200A in this way and, therefore, as shown in FIG. 5C, the operation terminal 200A can easily transmit the printing data again to the portable printer 100 at an appropriate timing (see a dashed arrow).

<Shared Mode>

On the other hand, the shared mode is a mode preferable when the one portable printer 100 is shared and used by a plurality of the operation terminals 200 alternately connecting thereto, for example, and the exclusive connection established as described above is disconnected at an appropriate timing (at the timing of switching to the sleep state in this example) after completion of the printing process. In particular, as shown in FIG. 6A, the one operation terminal 200A is exclusively connected to the portable printer 100, and printing data is transmitted from the operation terminal 200A (see a dashed arrow) so that a printing process is executed with the printing data. When the printing process is finished (the idle time has elapsed) and the portable printer 100 shifts to the sleep state, the exclusive connection is automatically disconnected at the same time (see FIG. 6B).

As a result, another operation terminal 200C can subsequently exclusively be connected to the portable printer 100 as shown in FIG. 6C to transmit printing data from the operation terminal 200C (see a dashed arrow) so that a printing process can easily be executed with the printing data.

<Control Procedure>

The control carried out by the CPU of the control circuit 141 of the portable printer 100 for achieving the technique will be described with reference to a flowchart of FIG. 7. This flow is triggered by powering on the portable printer 100, for example.

First, at step S10, the CPU of the control circuit 141 initializes a flag F to "0" indicative of the occupied mode. Subsequently, the flow goes to step S15.

At step S15, the CPU of the control circuit 141 activates the whole of the portable printer 100 and puts the parts of the portable printer 100 including the platen roller 111 and the thermal line head 112 into a standby state in which a print operation can be performed.

Subsequently, at step S20, the CPU of the control circuit 141 accepts an operation input of a mode selection (the shared mode or the occupied mode) from a user through the operation part 143.

At step S25, the CPU of the control circuit 141 selectively sets the mode related to connection/disconnection between the operation terminal 200 and the portable printer 100 to either the shared mode or the occupied mode in accordance with a result of acceptance of the operation input of step S20.

Subsequently, at step S26, the CPU of the control circuit 141 determines whether a connection request is made from the operation terminal 200 through the Bluetooth communication. If the connection request is made, the determination of step S26 is affirmative (S26:YES) and the flow goes to step S35 described later. If the connection request is not made, the determination of step S26 is negative (S26:NO) and the flow goes to step S30.

At step S30, the CPU of the control circuit 141 determines whether a predetermined idle time (three minutes in this example; the same applies hereinafter) has elapsed without a connection request at step S26. If three minutes have not elapsed, the determination of step S30 is negative (S30:NO), and the flow goes to step S26 to repeat the same procedure. If three minutes have elapsed, the determination of step S30 is affirmative (S30:YES), and the flow goes to step S31.

At step S31, the CPU of the control circuit 141 switches the whole of the portable printer 100 from the standby state of step S15 to the sleep state described above. Subsequently, the flow goes to step S32.

At step S32, the CPU of the control circuit 141 determines again whether a connection request is made from the same operation terminal 200 as that of step S26. If the connection request is not made, the determination of step S32 is negative (S32:NO) and the CPU waits in a loop until this determination becomes affirmative. If the connection request is made, the determination of step S32 is affirmative (S32:YES), and the flow goes to step S33.

At step S33, the CPU of the control circuit 141 shifts from the sleep state of step S31 to the standby state in which a print operation can be performed again. Subsequently, the flow goes to step S35.

At step S35, the CPU of the control circuit 141 determines whether the flag F is "1." If the flag F=1 is satisfied, the determination is affirmative (S35:YES), and the flow goes to step S41. If the flag F=0 is still satisfied, the determination is negative (S350:NO), and the flow goes to step S40.

At step S40, in accordance with the connection request of step S26 or S32, the CPU of the control circuit 141 uses the known technique described above to establish exclusive connection through the Bluetooth communication via the communication control part 142 with the operation terminal 200 from which the connection request is made. Subsequently, the flow goes to step S41.

At step S41, the CPU of the control circuit 141 determines whether printing data is received from the operation terminal 200 in association with the establishment of the communication connection of step S40. If the printing data is not received, the determination is negative (S41:NO), and the flow goes to step S50. If the printing data is received, the determination is affirmative (S41:YES), and the flow goes to step S46.

At step S46, the CPU of the control circuit 141 starts the printing process of the printing data received at step S41 from the operation terminal 200. Specifically, the CPU of the control circuit 141 controls the platen roller 111 to transport the print-receiving sheet S and controls the thermal line head 112 to form a desired print corresponding to the printing data on the transported print-receiving sheet S.

Subsequently, at step S47, the CPU of the control circuit 141 determines whether the printing process started at step S46 is finished. If the printing process is not finished, the determination is negative (S47:NO), and the flow returns to step S46 to repeat the same procedure. If the printing process is finished, the determination is affirmative (S47:YES), and the flow goes to step S41 to repeat the same procedure thereafter.

On the other hand, at step S50 subsequent to step S41 after step S40 or S47, the CPU of the control circuit 141 determines whether the idle time (three minutes) has elapsed without reception of printing data at step S41. If three minutes have not elapsed, the determination of step S50 is negative (S50:NO), and the flow goes to step S41 to repeat the same procedure. If three minutes have elapsed, the determination of step S50 is affirmative (S50:YES), and the flow goes to step S55.

At step S55, the CPU of the control circuit 141 determines whether the mode set at step S25 (in other words, the mode accepted at step S20) is the shared mode. If the mode is not the shared mode and is the occupied mode, the determination of step S55 is negative (S55:NO), and the flow goes to step S56 at which the CPU of the control circuit 141 sets the flag F to "1" indicative of the occupied mode. Subsequently, the flow goes to step S70.

On the other hand, if the mode is the shared mode, the determination of step S55 is affirmative (S55:YES), and the flow goes to step S60. At step S60, the CPU of the control circuit 141 disconnects the connection through the Bluetooth communication with the operation terminal 200 established at step S40 and sets the flag F to F=0 indicative of the shared mode at step S65, and the flow then goes to step S70.

At step S70, the CPU of the control circuit 141 switches the whole of the portable printer 100 to the sleep state described above as is the case with step S31. Subsequently, the flow goes to step S71.

At step S71, the CPU of the control circuit 141 determines whether a connection request is made from the operation terminal 200 as is the case with steps S26 and S32. If the connection request is not made, the determination of step S71 is negative (S71:NO), and the CPU waits in a loop until this determination becomes affirmative. If the connection request is made, the determination of step S71 is affirmative (S71:YES), and the flow goes to step S72.

At step S72, the CPU of the control circuit 141 shifts from the sleep state of step S70 to the standby state in which a print operation can be performed again. Subsequently, the flow returns to step S35 and the same procedure is repeated thereafter.

As described above, in this embodiment, the optimum mode can be executed and used in accordance with a form in which a user uses one portable printer 100 (in other words, the number of the operation terminals 200 using the printer). Therefore, the user can selectively use the optimum mode in accordance with the usage scene, so that the convenience can be improved.

Particularly in this embodiment, when the portable printer 100 enters the sleep state in the shared mode, the Bluetooth communication between the operation terminal 200 and the portable printer 100 is disconnected. Since the connection is disconnected after a printing process is reliably no longer executed, a possibility of causing a user to perform a cumbersome reconnection work due to premature disconnection can be eliminated to prevent the convenience from decreasing.

Particularly in this embodiment, the user himself/herself can selectively input which of the two modes, i.e., the shared mode or the occupied mode, is used (see step S20 of FIG. 7). As a result, the mode reliably reflecting the user's intention can selectively be used and the convenience can reliably be improved.

The present disclosure is not limited to the embodiment and can variously be modified without departing from the spirit and the technical ideas thereof. Such modification examples will hereinafter be described in order.

(1) When Mode is Automatically Selected in Accordance with Type of OS of Operation Terminal In this modified example, the CPU of the control circuit 141 identifies a type of the OS (operation system) of the connected operation terminal 200 after establishment of the exclusive connection and automatically selects and sets either the shared mode or the occupied mode in accordance with a result of the identification.

The control executed by the control circuit 141 of the portable printer 100 according to this modification example will be described with reference to a flowchart of FIG. 8.

In the flow shown in FIG. 8, steps S20 and S25 in the flow of FIG. 7 of the embodiment described above are deleted, and steps S27, S28, S29 are newly provided between steps S26 and S35 of FIG. 7.

Specifically, in FIG. 8, the CPU of the control circuit 141 determines whether a connection request is made from the operation terminal 200 through the Bluetooth communication at step S26 as is the case with FIG. 7 and, if the connection request is made, the determination of step S26 is affirmative (S26:YES) and the flow goes to newly provided step S27.

At step S27, the CPU of the control circuit 141 determines whether the OS of the operation terminal 200 is iOS. In particular, the connection request received at step S26 includes information (e.g., a type of a communication protocol) from which the OS of the operation terminal 200 can be identified. At step S27, the type of the OS of the operation terminal 200 (or the type of the operation terminal 200 itself; the same applies hereinafter) is determined based on the information. If the OS is not iOS, the determination of step S27 is negative (S27:NO), and the flow goes to step S29 at which the CPU of the control circuit 141 sets the mode related to connection/disconnection between the operation terminal 200 and the portable printer 100 to the shared mode.

On the other hand, if the OS is iOS, the determination of step S27 is affirmative (S27:YES), and the flow goes to step S28 at which the CPU of the control circuit 141 sets the mode related to connection/disconnection between the operation terminal 200 and the portable printer 100 to the occupied mode.

After step S28 or S29, the flow goes to step S35 as is the case with FIG. 7 and the same procedure is repeated thereafter.

The other procedures are the same as those of FIG. 7 and will not be described.

This modification example configured as described above produces the following advantage. In particular, after the exclusive connection is disconnected from the portable printer 100 as described above, the operation for reconnection from the operation terminal 200 may become very cumbersome depending on a type of the OS of the operation terminal 200 (or a type of the operation terminal 200 itself) (e.g., iOS described above). This modification example corresponds to such a case, and the shared mode or the occupied mode is selectively executed in accordance with a result of the identification of the OS of the operation terminal 200 by the control circuit 141. Specifically, when the OS of the operation terminal 200 is iOS, the mode is set to the occupied mode so that the Bluetooth communication is not disconnected, and if the OS of the operation terminal 200 is other than iOS, the mode is set to the shared mode so that the Bluetooth communication can be disconnected. In this way, for the type of the OS of the operation terminal 200 making the operation for reconnection cumbersome as described above, the occupied mode can automatically be executed so that the exclusive connection is not disconnected and the user's convenience can be improved.

(2) When Operation Terminal Generates and Transmits Disconnection Request Information to Portable Printer In this modification example, the portable terminal 200 selectively transmits to the portable printer 100 the printing data (serving as a command for the shared mode) with disconnection request information (information requesting a process of disconnecting the exclusive connection between the portable printer 100 and the operation terminal 200 at the time of the shift to the sleep state) added thereto, or the normal printing data (serving as a command for the occupied mode) without the disconnection request information.

The control carried out by the CPU 203 of the operation terminal 200 in this modification example will be described with reference to FIG. 9.

In FIG. 9, first, at step S105, the CPU 203 accepts an editing operation of print data for transmission to the portable printer 100. In particular, the CPU accepts edit of the print data in accordance with a user's operation of the operation part 202 of the operation terminal 200.

Subsequently, at step S120, the CPU 203 accepts a mode selection of the occupied mode or the shared mode in accordance with a user's operation of the operation part 202, for example.

At step S125, the CPU 203 determines whether the selected mode accepted at step S120 is the shared mode. If the mode is not the shared mode, the determination of step S125 is negative (S125:NO) and the flow goes to step S135 described later. If the mode is the shared mode, the determination of step S125 is affirmative (S125:YES) and the flow goes to step S130.

At step S130, the CPU 203 generates the disconnection request information described above requesting the portable printer 100 to execute a process of disconnecting the exclusive connection between the portable printer 100 and the operation terminal 200 at the time of the shift to the sleep state.

Subsequently, at step S140, the CPU 203 generates printing data corresponding to the editing contents of step S105 to which the disconnection request information generated at step S130 is added. The flow then goes to step S145 described later.

On the other hand, at step S135 subsequent to step S125, the CPU 203 generates printing data (without the disconnection request information) corresponding to the editing content of step S105. The flow then goes to step S145.

At step S145, the CPU 203 transmits a connection request via the communication control part 206 through the Bluetooth communication to the portable printer 100 with the known technique described above. The flow then goes to step S150.

At step S150, the CPU 203 determines whether an exclusive connection with the portable printer 100 is established in response to the connection request of step S145 by the portable printer 100 with the known technique described above.

Subsequently, at step S155, the CPU 203 transmits the printing data generated at step S135 or the printing data with the disconnection request information generated at step S140 via the communication control part 206 to the portable printer 100. This flow is then terminated.

The control carried out by the control circuit 141 of the portable printer 100 in accordance with the procedures of the flowchart of FIG. 9 in this modification example will be described with reference to a flowchart of FIG. 10.

In the flow shown in FIG. 10, steps S27, S28, and S29 in the flow of FIG. 8 are deleted, and steps S42, S43, S44 are newly provided between steps S41 and S46 of FIG. 8.

Specifically, in FIG. 10, the CPU of the control circuit 141 determines whether printing data is received from the operation terminal 200 at step S41 as is the case with FIG. 8. If the printing data is received, the determination is affirmative (S41:YES), and the flow goes to newly provided step S42.

At step S42, the CPU of the control circuit 141 determines whether the disconnection request information is added to the printing data received at step S41 from the operation terminal 200. If the disconnection request information is added to the printing data, the determination of step S42 is satisfied (S42:YES) and the flow goes to step S43 at which the CPU of the control circuit 141 sets the mode related to the connection/disconnection between the operation terminal 200 and the portable printer 100 to the shared mode.

On the other hand, if the disconnection request information is not added to the printing data, the determination of step S42 is not satisfied (S42:NO) and the flow goes to step S44 at which the CPU of the control circuit 141 sets the mode related to the connection/disconnection between the operation terminal 200 and the portable printer 100 to the occupied mode.

After step S43 or S44, the flow goes to step S46 as is the case with FIG. 8 and the same procedure is repeated thereafter.

The other procedures are the same as those of FIG. 8 and will not be described.

Also in this modification example, the same advantage as the embodiment can be acquired. Additionally, in this modification example, whether the portable printer 100 is operated in the shared mode or the occupied mode can be specified from the operation terminal 200. As a result, the user's convenience can further be improved.

(3) Other

Although the Bluetooth communication between the operation terminal 200 and the portable printer 100 is disconnected when the portable printer 100 enters the sleep state in the shared mode in the above description, this is not a limitation. In particular, the Bluetooth communication may be disconnected at an appropriate timing before entering the sleep state, for example, when the printing process is finished.

Although the operation terminal 200 and the portable printer 100 are connected through the Bluetooth communication in the example described above, this is not a limitation. In particular, the present disclosure is applicable in the same way even when the operation terminal 200 and the portable printer 100 are connected through appropriate mutually-recognized wireless communication with connection authentication other than Bluetooth, such as ad-hoc communication.

Although the present disclosure is applied to the portable printer 100 driven by the battery power source as a printer in the example described above, this is not a limitation. In particular, by way of example, the present disclosure may be applied to printers including a printer forming images and printing characters on regular print-receiving sheets S of the A4, A3, B4, and B5 sizes etc., and a print label producing device performing desired printing on a print-receiving tape to produce a print label. The same advantage is acquired also in this case.

In the above description, the arrows shown in FIG. 4 indicate an example of signal flow and are not intended to limit the signal flow directions.

The flowcharts shown in FIGS. 7, 8, 9, and 10 are not intended to limit the present disclosure to the procedures shown in the flows and the procedures may be added/deleted or may be executed in different order without departing from the spirit and the technical ideas of the disclosure.

The techniques of the embodiment and modification examples may appropriately be utilized in combination other than those described above.

What is claimed is:
1. A printer comprising:
a plurality of operation mechanisms that are configured to be operated by supplied electric power and include a feeder configured to feed a print-receiving medium and a printing head configured to perform a desired print on said print-receiving medium;
a communication device that is provided in said printer and is configured to perform mutually-recognized wireless communication;
a processor; and
a memory;
the memory storing computer-executable instructions that, when executed by the processor, cause the printer to perform:
a connection control process for establishing an exclusive connection with a first operation terminal through said mutually-recognized wireless communication while excluding at least one second operation terminal other than said first operation terminal; and
an operation control process for performing printing onto said print-receiving medium by controlling said plurality of operation mechanisms in accordance with printing data received from said first operation terminal after establishment of said exclusive connection in said connection control process; and
a mode control process for selectively executing a first switching mode or a second switching mode, wherein said exclusive connection established with said first operation terminal is disconnected at a predetermined timing after completion of said printing in the first switching mode, wherein said exclusive connection established with said first operation terminal is main- tained without being disconnected at said predetermined timing in the second switching mode.

2. The printer according to claim 1, wherein
the memory stores instructions that, when executed by the processor, cause the printer to further perform:
a switching control process for switching to a predetermined low power consumption state when a predetermined reference time has elapsed after completion of said printing; and
a return control process for returning from said low power consumption state to a standby state in which said printing is executable based on said printing data, and wherein
said first switching mode executed in said mode control process is a mode in which said exclusive connection is disconnected at said predetermined timing at which switching to said low power consumption state is performed when said reference time has elapsed after completion of said printing.

3. The printer according to claim 1, wherein
the memory stores instructions that, when executed by the processor, cause the printer to further perform
a first identification process for identifying a type of said first operation terminal to be connected or a type of an operating system of the first operation terminal, and wherein
in said mode control process, either said first switching mode or said second switching mode is selectively executed in accordance with an identification result of said first identification process.

4. The printer according to claim 1, wherein
the memory stores instructions that, when executed by the processor, cause the printer to further perform
a second identification process for identifying whether said printing data received from said first operation terminal includes disconnection request information generated by said first operation terminal, and
wherein in said mode control process, either said first switching mode or said second switching mode is selectively executed in accordance with an identification result of said second identification process.

5. The printer according to claim 3, wherein
in said first identification process, a type of an operating system of said first operation terminal to be connected is identified, and
wherein in said mode control process, the second switching mode is executed in a case that a specific operating system is identified in said first identification process, while said first switching mode is executed in a case that an operating system other than said specific operating system is identified in said first identification process.

6. The printer according to claim 4, wherein
in said mode control process, the first switching mode is executed in a case that said printing data includes said disconnection request information in said second identification process, while the second switching mode is executed in a case that said printing data does not include said disconnection request information in said second identification process.

7. The printer according to claim 1, wherein
the memory stores instructions that, when executed by the processor, cause the printer to further perform
an accepting process for accepting an operation input to select said first switching mode or said second switching mode, wherein
in said mode control process, either said first switching mode or said second switching mode is selectively executed in accordance with an acceptance result in said accepting process.

8. An operation terminal comprising:
a communication device that is provided in said operation terminal and is configured to perform mutually-recognized wireless communication to a printer configured to switch to a predetermined low power consumption state when a predetermined reference time has elapsed after completion of printing onto a print-receiving medium in accordance with printing data;
a processor; and
a memory;
the memory storing computer-executable instructions that, when executed by the processor, cause the operation terminal to perform:
an information generating process for generating disconnection request information to request the printer to execute a process for disconnecting an exclusive connection established between said printer and said operation terminal via said communication device at a predetermined timing after completion of said printing; and
a transmission control process for transmitting via said communication device to said printer said printing data to which said disconnection request information generated in said information generating process is added.

9. The operation terminal according to claim 8, wherein
in said transmission control process, either said printing data with said disconnection request information added thereto or said printing data without said disconnection request information is selectively transmitted to said printer.

10. The operation terminal according to claim 8, wherein
said disconnection request information generated in said information generating process is information to request the printer to execute a process for disconnecting said exclusive connection at said predetermined timing at which switching to said low power consumption state is performed when said reference time has elapsed after completion of said printing by said printer.

11. A non-transitory computer-readable recording medium storing a printing process program for executing steps on a computing device, the printing process program being readable for said computing device of an operation terminal that includes a communication device configured to perform mutually-recognized wireless communication to a printer configured to switch to a predetermined low power consumption state when a predetermined reference time has elapsed after completion of printing onto a print-receiving medium in accordance with printing data, said steps comprising:
an information generating step for generating disconnection request information to request the printer to execute a process for disconnecting an exclusive connection established between said printer and said operation terminal via said communication device at a predetermined timing after completion of said printing; and
a transmission control step for transmitting via said communication device to said printer said printing data to which said disconnection request information generated in said information generating step is added.

12. The recording medium according to claim 11, wherein in said transmission control step, either said printing data with said disconnection request information added thereto or said printing data without said disconnection request information is selectively transmitted to said printer.

13. The recording medium according to claim 11, wherein said disconnection request information generated in said information generating step is information to request the printer to execute a process for disconnecting said exclusive connection at said predetermined timing at which switching to said low power consumption state is performed when said reference time has elapsed after completion of said printing by said printer.

* * * * *